UNITED STATES PATENT OFFICE.

EDWARD JAMES MOOKLAR, OF HONOLULU, TERRITORY OF HAWAII.

PROCESS OF PRODUCING A FOOD PRODUCT.

1,141,816. Specification of Letters Patent. Patented June 1, 1915.

No Drawing. Application filed December 11, 1913. Serial No. 806,102.

*To all whom it may concern:*

Be it known that I, EDWARD JAMES MOOKLAR, a citizen of the United States, residing at Honolulu, Island of Oahu, Territory of Hawaii, have invented a new and useful Process of Producing a Food Product, of which the following is a full, clear, and exact description.

My invention relates to the process of producing a food-drink for human consumption, to wit, a beverage or breakfast drink or coffee substitute, from the specially treated fruit or pods (including the seeds) of the trees of the botanical genus known as the algaroba (*Prosopis juliflora*) and the mesquite (*Prosopis glandulosa*), the said processes being substantially as follows: (1) Selecting and cleaning the whole bean pods. (2) Rolling or crushing the whole pods, in order to expose as much as possible of the inner pulp of the pods. (3) Crystallizing the sugar content of the pulp so obtained (as in 2); this being accomplished by submitting the pulp to the desiccating action of air, that is to say, heated air or cold, dry air, or air at normal temperature rendered dry by the use of chemical desiccating agents. In using heated air, to which preference is given in this process, care is exercised to prevent the temperature from rising above the point of caramelization of the sugar content of the pulp, approximately 200° C.

The object of crystallizing the sugar content of the pulp is, to render the pulp fit for grinding or pulverizing, as, in the natural, ripened state of the pods, the pulp is of such a soft and gummy nature, due to its richness in sugar, that it clogs heats and chokes the grinding apparatus, and the pulp must be treated by one of the processes indicated to make the grinding of it possible.

When the sugar crystals have attained the proper degree of hardness, as indicated by the friability of the pulp, the pulp undergoes the following treatment: (4) Grinding or pulverizing into a meal. (5) Roasting the meal (4) until it attains a uniform brown or dark brown color and develops the desired aroma. (6) Sifting the roasted meal (5) to desired fineness or to desired granular form.

The foregoing six (6) steps produce the substance from which the beverage may be made.

The beverage is prepared in the following manner: (7) Place one tablespoonful of the prepared article obtained by the above-mentioned process, in one pint of boiling water and permit the water to boil with the roasted meal in it for a minute or two, then remove from fire or source of heat and put aside another minute or two to settle, then strain and serve with milk or cream or beaten egg albumen, and sugar to taste. The strength of the beverage may be increased by using a larger proportion of the roasted meal than that indicated, according to taste. And to obtain the soluble extract of the roasted meal, for the purpose of preparing the beverage at the table in the individual cups, the following method is followed: (8) Proceed as in steps (1) to (6) inclusive, as stated, to obtain the roasted prepared meal, or start with the roasted prepared meal taken from stock which has been obtained by the process outlined, and extract the soluble portion of the roasted prepared meal by percolation and filtration; then evaporate the filtrate to dryness. The dry substance thus obtained is the soluble extract, and the beverage is prepared therefrom by dissolving in a cup of hot water the quantity of the dry extract which one's taste may elect, the average being, say, one-half a small teaspoonful to a whole teaspoonful of the powder added to a breakfast cup of hot water. Sugar, milk or cream, or beaten egg albumen are added, as may be desired.

Having thus announced and particularly described the nature of my said invention, and in what manner the same is to be made or manufactured and used, what I claim is—

1. The process of producing a food product comprising the crystallization of the sugar of the fruit of the algaroba tree, grinding of said crystallized fruit, and roasting of the ground crystallized fruit until the same has attained a brown color.

2. The process of producing a food product comprising the drying of the clean pods and beans of the algaroba tree to the point of crystallization of the sugar contained in the pods and beans, grinding the crystallized pods and beans, and roasting said ground matter until the same has reached a substantially brown color.

3. The process of producing a food preparation comprising the drying of the fruit of the algaroba tree to approximately 205° centigrade, then grinding the said fruit to the desired fineness, and finally roasting the ground meal until the same reaches a substantially brown color.

4. The process of producing a food preparation comprising the drying of the fruit including the pods of the algaroba tree to the point of crystallization of the sugar contained in such fruit, then grinding said fruit to the desired fineness, roasting the ground meal until the same attains a substantially brown color, removing the extract from the ground meal by percolation and filtration and then evaporate the filtrate to dryness.

In testimony whereof I have signed my name to this specification in the presence of two subscribing witnesses.

EDWARD JAMES MOOKLAR.

Witnesses:
GEO. RACUITZ,
SAM L. AKAI.